United States Patent
Asnaashari

(10) Patent No.: US 9,471,417 B1
(45) Date of Patent: Oct. 18, 2016

(54) METHODS AND APPARATUS FOR BACK-ANNOTATING ERRORS IN A RRAM ARRAY

(71) Applicant: Crossbar, Inc., Santa Clara, CA (US)

(72) Inventor: Mehdi Asnaashari, Danville, CA (US)

(73) Assignee: CROSSBAR, INC., Santa Clara, CA (US)

( * ) Notice: Subject to any disclaimer, the term of this patent is extended or adjusted under 35 U.S.C. 154(b) by 23 days.

(21) Appl. No.: 14/630,143

(22) Filed: Feb. 24, 2015

(51) Int. Cl.
*G11C 29/00* (2006.01)
*G06F 11/10* (2006.01)

(52) U.S. Cl.
CPC .................. *G06F 11/1008* (2013.01)

(58) Field of Classification Search
CPC .......... G11C 11/1659; G11C 11/1673; G11C 13/0002; G11C 13/003
USPC ......................................................... 714/764
See application file for complete search history.

(56) References Cited

U.S. PATENT DOCUMENTS

| | | | |
|---|---|---|---|
| 8,271,855 B2* | 9/2012 | Norman | G11C 11/56 714/763 |
| 9,098,661 B1* | 8/2015 | Biswas | G06F 17/5045 |
| 2007/0143648 A1* | 6/2007 | Andreev | G11C 5/04 714/718 |
| 2008/0162854 A1* | 7/2008 | Hashimoto | G06F 11/1068 711/167 |
| 2016/0005461 A1* | 1/2016 | Jo | G11C 29/026 365/148 |

\* cited by examiner

*Primary Examiner* — David Ton
(74) *Attorney, Agent, or Firm* — Amin, Turocy & Watson, LLP

(57) ABSTRACT

A two-terminal memory array can be configured to address a single memory cell. A two-terminal memory array can further be configured to mitigate disturb errors associated with other types of memory (e.g., non-two-terminal memory such as NAND flash memory). Mitigation of disturb errors can allow re-writes and/or overwrites of data stored by the cells without a prior erase operation. In this regard, errors in the data read from a memory array can be corrected by error-correction code (ECC) and associated corrected data can be written back to the memory cells that store the portions of data determined by the ECC to be erroneous data and/or incorrect or bad data.

22 Claims, 10 Drawing Sheets

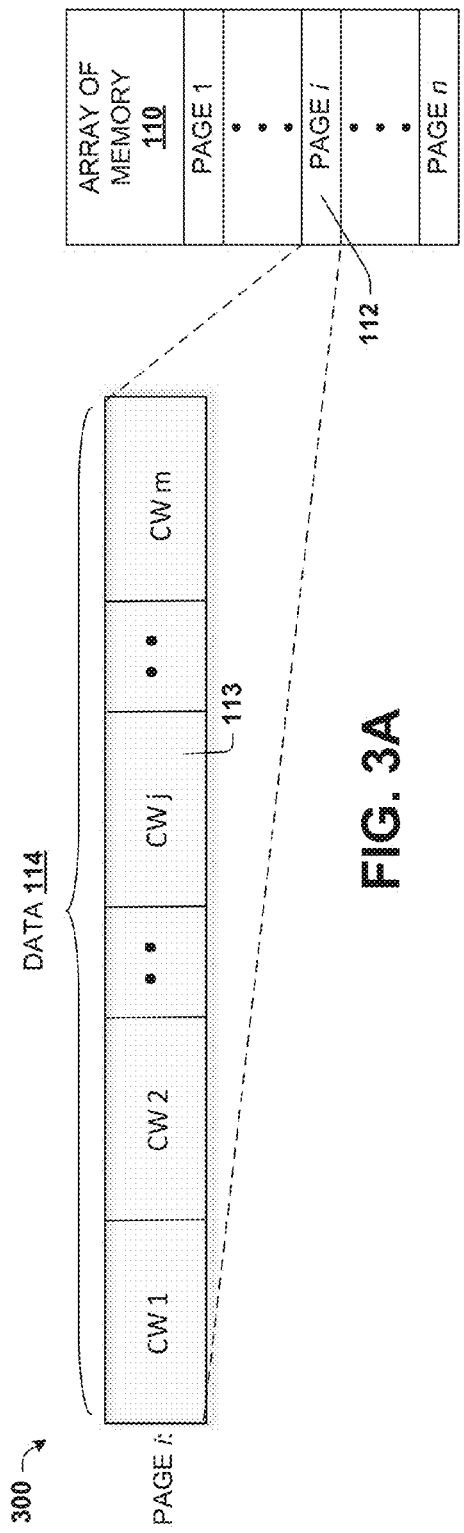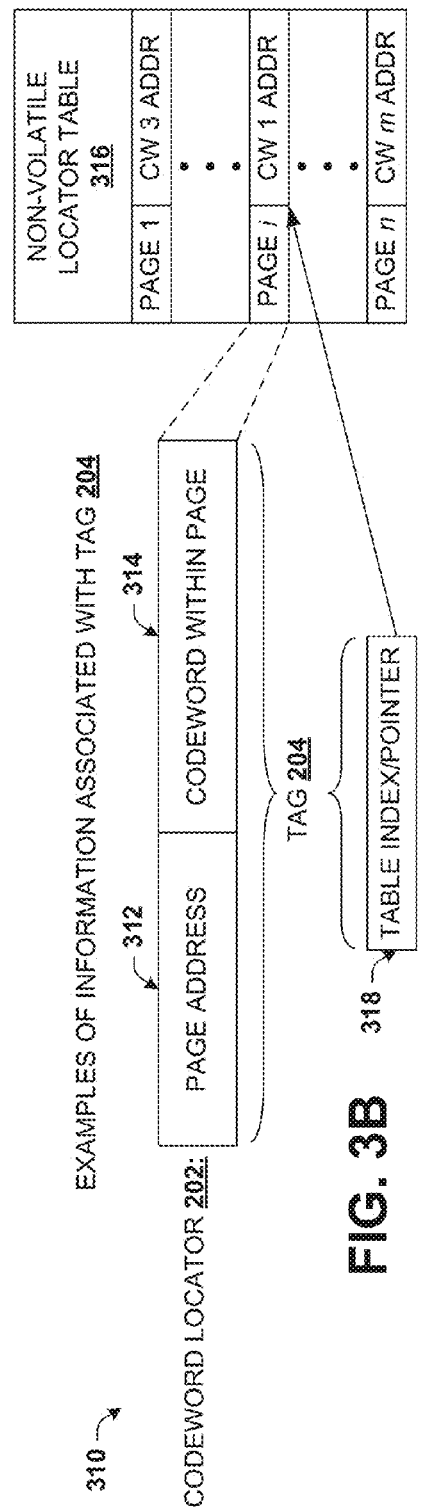
FIG. 3A
FIG. 3B

US 9,471,417 B1

METHODS AND APPARATUS FOR BACK-ANNOTATING ERRORS IN A RRAM ARRAY

TECHNICAL FIELD

This disclosure generally relates to correcting errors in memory that have been detected by utilizing error-correcting code (ECC) in connection with reading data from the memory.

BACKGROUND

Resistive-switching memory represents a recent innovation within the field of integrated circuit technology. While much of resistive-switching memory technology is in the development stage, various technological concepts for resistive-switching memory have been demonstrated by the inventor(s) and are in one or more stages of verification to prove or disprove associated theories or techniques. The inventor(s) believe that resistive-switching memory technology shows compelling evidence to hold substantial advantages over competing technologies in the semiconductor electronics industry.

The inventor(s) believe that resistive-switching memory cells can be configured to have multiple states with distinct resistance values. For instance, for a single bit cell, the restive-switching memory cell can be configured to exist in a relatively low resistance state or, alternatively, in a relatively high resistance state. Multi-bit cells might have additional states with respective resistances that are distinct from one another and distinct from the relatively low resistance state and the relatively high resistance state. The distinct resistance states of the resistive-switching memory cell represent distinct logical information states, facilitating digital memory operations. Accordingly, the inventor(s) believe that arrays of many such memory cells, can provide many bits of digital memory storage.

The inventor(s) have been successful in inducing resistive-switching memory to enter one or another resistive state in response to an external condition. Thus, in transistor parlance, applying or removing the external condition can serve to program or de-program (e.g., erase) the memory. Moreover, depending on physical makeup and electrical arrangement, a resistive-switching memory cell can generally maintain a programmed or de-programmed state. Maintaining a state might require other conditions be met (e.g., existence of a minimum operating voltage, existence of a minimum operating temperature, and so forth), or no conditions be met, depending on the characteristics of a memory cell device.

The inventor(s) have put forth several proposals for practical utilization of resistive-switching technology to include transistor-based memory applications. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors.

In light of the above, the inventor(s) desire to continue developing practical utilization of resistive-switching technology.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

The subject disclosure provides for a memory device that can correct errors in data read from memory cells of a memory array and write back to those memory cells the corrected data. In some embodiments, memory cells that do not have errors are not written to. The memory device can comprise a controller, an error-correcting code (ECC) component, and an error back-annotator component.

The controller can receive data from a memory array. The data can comprise cell data representing a portion of the data that is stored by a particular memory cell. The ECC component can detect bit error(s) associated with the cell data according to an ECC algorithm. In other words, the ECC component can determine which cells store incorrect data. The ECC component can generate corrected data, according to the ECC algorithm, representing the cell data that has been corrected by the ECC component. The error back-annotator component can generate a memory correction command(s) characterized by programming only the memory cell(s) that store incorrect data, with the corrected data.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

FIG. 3A depicts an example illustration providing an example in which the data represents a page of memory that is divided into many codewords in accordance with certain embodiments of this disclosure.

FIG. 3B depicts an example illustration providing an example of information associated with the tag managed by the codeword locator component in accordance with certain embodiments of this disclosure.

DETAILED DESCRIPTION

Introduction

Figure 1:
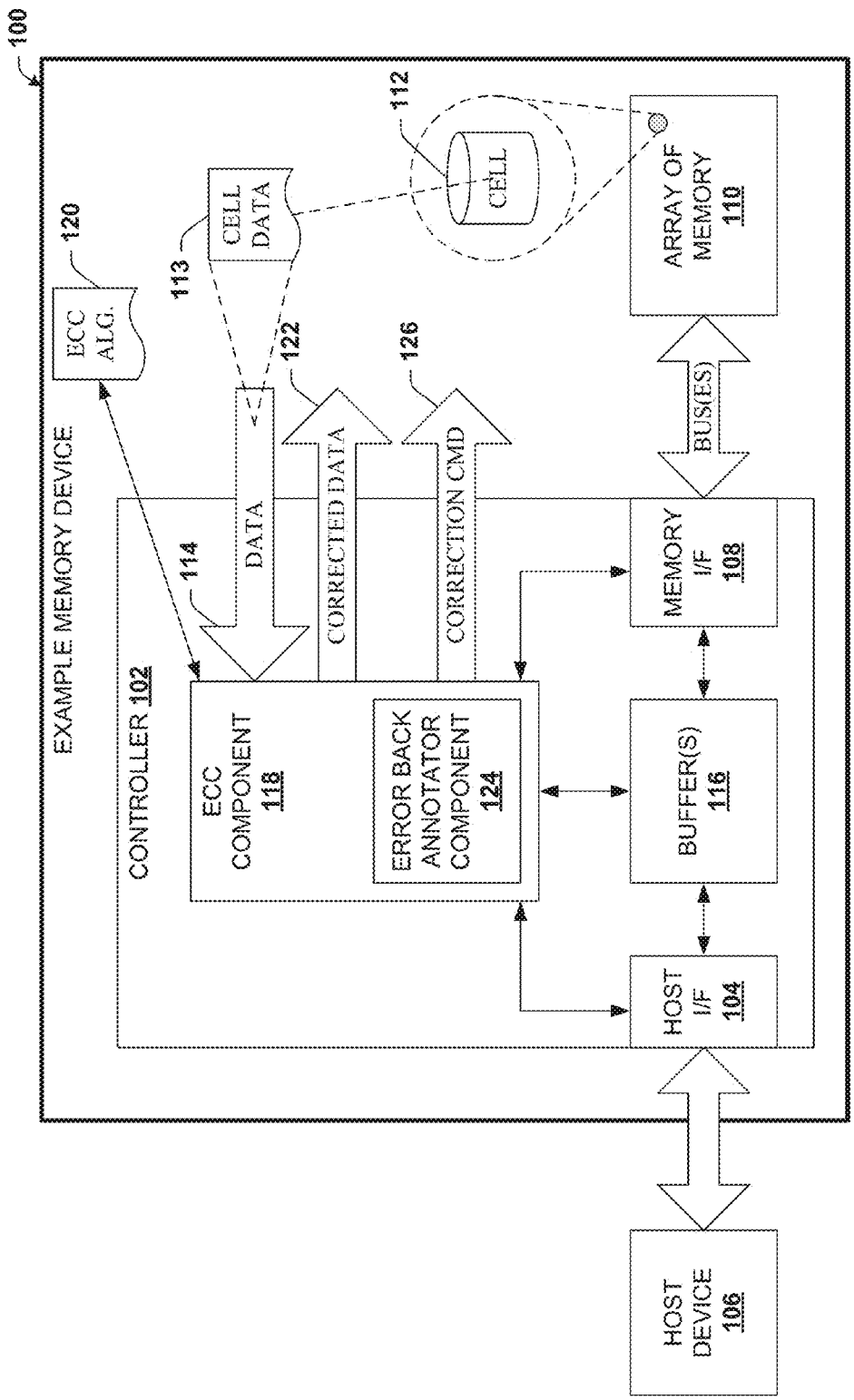
FIG. 1 illustrates a block diagram of an example memory device that can provide for writing back corrected data to memory cells having errors detected by error-correction code in accordance with certain embodiments of this disclosure.

Error-correction code (ECC) provides an important function and in modern memory device architectures, given that data stored to memory can be corrupted for a variety of reasons. When data is stored to memory, that data is typically fed into an encoder portion of an ECC engine that generates parity data. Both the data and the associated parity data are then stored to the memory. When the data is later read from memory, both the data and the associated parity data are retrieved from memory. Generally, the data is stored to a buffer, and fed, along with associated parity data, into a decoder portion of the ECC engine that detects and typically corrects any errors that may have occurred, whether due to hard errors (e.g., resulting from memory cell failure) or soft errors (e.g., resulting from improper programming of the cell or subsequent corruption of the data). If errors are detected, those errors are generally corrected in the buffer prior to being transmitted to a host device that issued the read operation. As a result of ECC functions, even though certain errors exist in memory, those errors can be corrected after being read from memory.

One of the most popular types of device memory is NAND flash memory. NAND flash memory has been successful in the marketplace, but is believed by the inventor(s) to have certain limitations. For example, NAND flash memory is known to be a "dirty" memory, so-called because it tends to have a high bit-error rate (BER). Working with dirty memory typically requires comprehensive ECC coverage, which can be expensive in terms of speed, storage and other resources, additional circuitry and logic, and so on. Compounding this issue are other disadvantages of NAND flash memory. As one example, NAND flash memory cannot write to memory in data increments smaller than a page of memory and cannot erase memory in data increments smaller than a block of memory (many pages). As another example, due to the potential for write disturb errors, NAND flash memory typically must erase a memory location before that memory location can be programmed with other data.

Accordingly, if all goes well for NAND flash memory, any errors in the stored data can be corrected by an ECC engine. Specifically, NAND flash memory controllers are able to detect errors, and once that data is moved to the buffer, correct the errors in the buffer. However, NAND flash memory controller can not re-write the corrupted memory cells with corrected data because such is either infeasible or impossible due to the disadvantages noted above. For example, NAND flash memory does not have the capability to write to individual memory cells. Moreover, in order to write a given cell with corrected data, that cell and every other cell in the same block of memory would need to be first erased. As a result, correcting errors in NAND flash memory is simply too expensive and impractical. Instead, errors in memory keep accumulating until the number of errors in a particular page of memory approaches the limits of what can be handled by the ECC engine, in which case the entire page or block is scrubbed and/or marked bad. During this scrubbing process (which is extremely expensive and not done until there are a high number of errors) the page is read from memory, corrected, and the corrected data is written to a different (clean) page of memory. It is appreciated that data in the physical cell is never corrected, but rather, corrected data is written to a different cell.

Embodiments of this disclosure relate to mechanisms or techniques for writing corrected data back to memory. In that regard, when data is read from memory (e.g., in response to a read command from a host device), the data can be placed in a buffer and checked by an ECC engine for errors. If erroneous data is stored in a memory cell location, that erroneous data is corrected not only in the buffer, but also at the memory cell location where the data originated. In some embodiments, such can be accomplished by leveraging two-terminal memory architectures the inventor(s) believe have advantages over NAND flash memory. For example, the two-terminal memory disclosed herein can, in some embodiments, be addressable at a bit level and/or a memory cell level. As another example, the disclosed two-terminal memory is not subject to write disturbs that affect NAND flash memory and can therefore overwrite and/or re-write data in a given memory cell without the need to first erase the data. Accordingly, bit errors discovered by an ECC engine can be corrected at the memory location that sourced the bit error(s), while leaving other adjacent memory locations alone, e.g., not writing, or disturbing the adjacent memory locations such as would occur when writing to a page of memory to correct only a subset of bits in the page. Such can provide certain benefits over other memory devices. For example, ECC logic, circuitry, and overhead can be reduced. Additionally or alternatively, the capabilities of a given ECC engine can provide better coverage, which can extend device life of the cells in the memory array. It is understood that embodiments disclosed herein can support multi-level (MLC) cell memory or single-level cell (SLC) memory.

Examples of two-terminal memory technology include resistive memory (e.g., resistive-switching memory cell), ferromagnetic memory, phase change memory, magneto-resistive memory, organic memory, conductive bridging memory, and so on. Embodiments of the subject disclosure can provide a filamentary-based memory cell. One example of a filamentary-based memory cell can comprise: a conductive layer (e.g. TiN, TaN, TiW) or a conductive silicon (Si) bearing layer (e.g., polysilicon, polycrystalline SiGe, etc.) a resistive switching layer (RSL) having crystalline defects or defectregions (e.g. amorphous silicon, intrinsic silicon, non-stoichiometric silicon oxide); and an active metal layer for providing filament forming particles to the defect regions of RSL. In various examples, the active metal layer can include, among others: silver (Ag), gold (Au), titanium (Ti), nickel (Ni), aluminum (Al), chromium (Cr), tantalum (Ta), iron (Fe), manganese (Mn), tungsten (W), vanadium (V), cobalt (Co), platinum (Pt), and palladium (Pd)), alloys of such metals, as well as materials rich in such metals, such as non-stiochiometric metal compounds. Other suitable conductive materials, as well as compounds or combinations of the foregoing can be employed for the active metal layer in some aspects of the subject disclosure. In various embodiments, particles of metal derived from the active metal layer become trapped within the defect regions of the RSM. These trapped particles are neutral metal particles that form conductive filaments within the RSM. Some details pertaining to embodiments of the subject disclosure similar to the foregoing example can be found in the following U.S. patent applications that are licensed to the assignee of the present application for patent: application Ser. No. 11/875,541 filed Oct. 19, 2007 and application Ser. No. 12/575,921 filed Oct. 8, 2009, each of which are incorporated by reference herein in their respective entireties and for all purposes.

In some aspects, the two-terminal memory can comprise 20 nanometer (nm) technology, whereas in other aspects the two-terminal memory can comprise sub-20 nanometer technology (e.g., 15 nm, 10 nm, 5 nm, and others). Moreover, the two-terminal memory can have a component area that is less than about 5 $F^2$ (e.g., about 4.28 $F^2$). In some aspects, three-dimensional stacks of two-terminal memory arrays can be provided, reducing component area. For instance, a 4.28 $F^2$ device can have an effective component area of 2.14 $F^2$ for a three-dimensional device having two stacked layers. As another example, the 4.28 $F^2$ device can have an effective component area of 1.07 $F^2$ for a three-dimensional device having four stacked layers, and so on. In the case of multi-level cells (MLC), two stacked layers of cells that can represent two bits of data per cell can have an effective component area of 1.07 $F^2$, and better component area metrics can be achieved by either increasing the number of stacks or the number of bits represented by the cells.

In some embodiments disclosed herein, pipelining can be supported. For example, a codeword locator can be included that tags various portions (e.g., codewords) of the data read from memory with information to identify and/or track the source of the data. Accordingly, while the ECC engine can identify a bit error within a given codeword, the codeword locator can provide information relating to a specific page as well as to a specific codeword within that page. As noted, such can allow for correcting errors in memory, even in cases where pipelining is utilized by an associated memory controller.

EXAMPLES

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring initially to FIG. 1, an example memory device 100 is depicted. Memory device 100 can provide for writing back corrected data to memory cells storing errors detected by error-correction code. Memory device 100 can be a removable storage device, which can be connected to or disconnected from a computing device (e.g., a computer, a laptop, a terminal, a smart phone, a table computer, etc.) by way of a communication interface (e.g., a universal serial bus (USB) interface, or another memory bus or interface). In some embodiments, memory device 100 can be deployed on a hardware card for connecting with a server device or other computing device. In still other embodiments, memory device 100 can be a stand-alone device configured to communicate with a remote host device via a suitable remote communication platform (e.g., a wireless interface, a cellular interface, a satellite interface, a wired interface, an Ethernet interface, a broadband over power line interface, memory modules such as DIMMs communicating over buses or interfaces such as DDR3 or DDR4, etc., or the like, or a suitable combination thereof).

Memory device 100 can comprise a controller 102. Controller 102 can be configured to interface to a host device 106 over a host interface 104. Host interface 104 can operate to receive (e.g., high-level) host commands from the host computing device related to array of memory 110 on memory device 100. Suitable host commands can include a write command, a read command, an erase command, an overwrite command, or the like, or suitable combinations thereof. Additionally, host interface 104 can be configured to receive data from the host device 106 related to a host write command, or provide data stored at array of memory 110 to the host device 106 in response to a host read command. Controller 102 can further comprise a memory interface 108 configured to communicate with and execute memory operations (e.g., via low-level commands) in conjunction with array of memory 110 over one or more memory channels/data buses. These data buses can be 8-bit channels, 16-bit channels, or another suitable configuration. In some embodiments, memory controller 102 can perform low-level memory operations with array of memory 110, including write, erase, read, etc. in accord with the high-level host commands.

The array of memory 110 can include an array of memory cells with configurable states that are mapped to data values, and thus can store information. For example, array of memory 110 can include cell 112 that stores cell data 113 representing all or a portion of data 114. Cell data 113 is intended to represent the specific information stored at cell 112, which is a subset of data 114. In some embodiments, cell 112 can be two-terminal memory. As described herein, two-terminal memory (e.g., cell 112) can include a top electrode and a bottom electrode, with a switching material in between. Various stable states of the two terminal memory can be produced in response to application of an external electrical characteristic (e.g., changing voltages associated with the top and/or bottom electrode). In response, material from the top or bottom electrode can extend into the switching material based on, e.g., the magnitude of the external electrical characteristic. As this material intrudes into the switching material, electrical characteristics (e.g., resistance, conductance, etc.) of the two-terminal memory cell change, representing measurable states that can be mapped to data values.

In some embodiments, cell 112 can be non-volatile. For example, cell 112 can maintain a given state, and therefore store data 114, without application of an external power source. Some examples of non-volatile memory to which some embodiments of the disclosed subject matter is directed include, e.g., NAND flash memory, phase-change memory (PCM) also sometimes referred to as phase-change random access memory (PCRAM), resistive random access memory (RRAM), magnetoresistive random access memory (MRAM), conductive-bridging random access memory (CBRAM) and so forth. In some embodiments, cell 112 can be a multi-level cell characterized by different measurable states of cell 112 representing multiple bits of cell data 113. As used herein, data 114 is intended to relate to information to be read from array of memory 110 (e.g., in response to a host device 106 read command), programmed to array of memory 110 (e.g., in response to a host device 106 write command), or otherwise associated with array of memory 110 and/or cell 112.

Memory controller 102 can further comprise a central processing unit (not shown), one or more buffers 116, an error correcting code (ECC) component 118, an error back-annotator component 124, as well as other suitable circuitry, modules, or components. The CPU can be configured to execute instructions associated with memory device 100. Buffers 116 can be a set of registers or other storage elements employed for temporarily storing data such as data 114. For example, if host device 106 requests data from array of memory 110, the requested data can be stored to buffers 116 and updated (e.g., in response to an error being determined to exist) prior to being provided to host device 106. Optionally, data transmitted by host device 106 (e.g., as part of a write instruction) can be temporarily stored to buffers 116 prior to being programmed to array of memory 110.

ECC component 118 can be configured to receive data 114 (that includes cell data 113), either directly from array of memory 110 or from buffer 116. In response, ECC component can detect bit error(s) associated with cell data 113 in accordance with a suitable ECC algorithm 120. ECC component 118 can further generate corrected data 122 according to the ECC algorithm 120. By way of example, such detection/correction and/or algorithm 120 can be based on various ECC algorithms such as, e.g., a Hamming code, a Bose-Chaudhuri-Hocquenghem (BCH) code, a Reed-Solomon (RS) code, a low-density parity check (LDPC) code, or the like. Corrected data 122 can represent cell data 113 that has been corrected by ECC component 118. In some embodiments, data 114 can include parity data generated by ECC component 118 when data 114 was written to array of memory 110.

Once corrected data 122 is generated, data 114 can be updated in buffer 116 to reflect the correction of the bit error(s). Hence, when data 114 is ultimately provided to host device 106 (e.g., in response to a memory read request), data 114 typically will not include any errors.

Furthermore, error back-annotator component 124 can be configured to generate memory correction command 126. Memory correction command 126 can be characterized by an instruction to program memory cell(s) 112 with corrected data 122. It is understood that the instruction to update cell(s) 112 differs from another instruction to update buffer 116 with corrected data 122. For example, fixing bit errors in buffer 116 can ensure that host device 106 receives data 114 without errors, while fixing bit errors in array of memory 110 (e.g., the bit error in cell data 113 of cell 112) can mitigate the reoccurrence of the same error when cell data 113 is subsequently read. Consequently, the bit error(s) do not accumulate as is the case in other memory devices and resources are not wasted on repeatedly correcting the same bit error(s) each time data is read from a cell with bit error(s).

In some embodiments, correction command(s) 126 can operate only on cells of array of memory 110 that are associated with bit errors detected by ECC component 118. Said differently, memory correction command(s) 126 can individually target the cells that store bad data and only those cells. Such is further distinct from scrubbing operations performed by other memory devices, as those operations typically must operate on an entire block or page of memory in order to correct a few bit errors. In some embodiments, correction command(s) 126 can be similar or identical to a write command that writes the corrected data 122 to the associated to the associated cell(s). In some embodiments, correction command(s) 126 can include a correction instruction and an error bit address. The correction instruction can be an instruction to flip the data in the memory cell defined by the error bit address. For example, if the memory cell stores a "0", which was determined to be an error, that memory cell can be flipped to store a "1" instead, which represents a correction to the bit error. At the interface level (e.g., eight or 16-bit interfaces), such can be effectuated by reading the cell at the error bit address, sending the read data to an XOR to flip the data, writing the XOR output to the cell. In operation, the cell is efficiently reprogrammed from a first state that is logically mapped to a data value of "0" (that was determined to be an error) to a second state that is logically mapped to a data value of "1" in response to correction command(s) 126.

Figure 2:
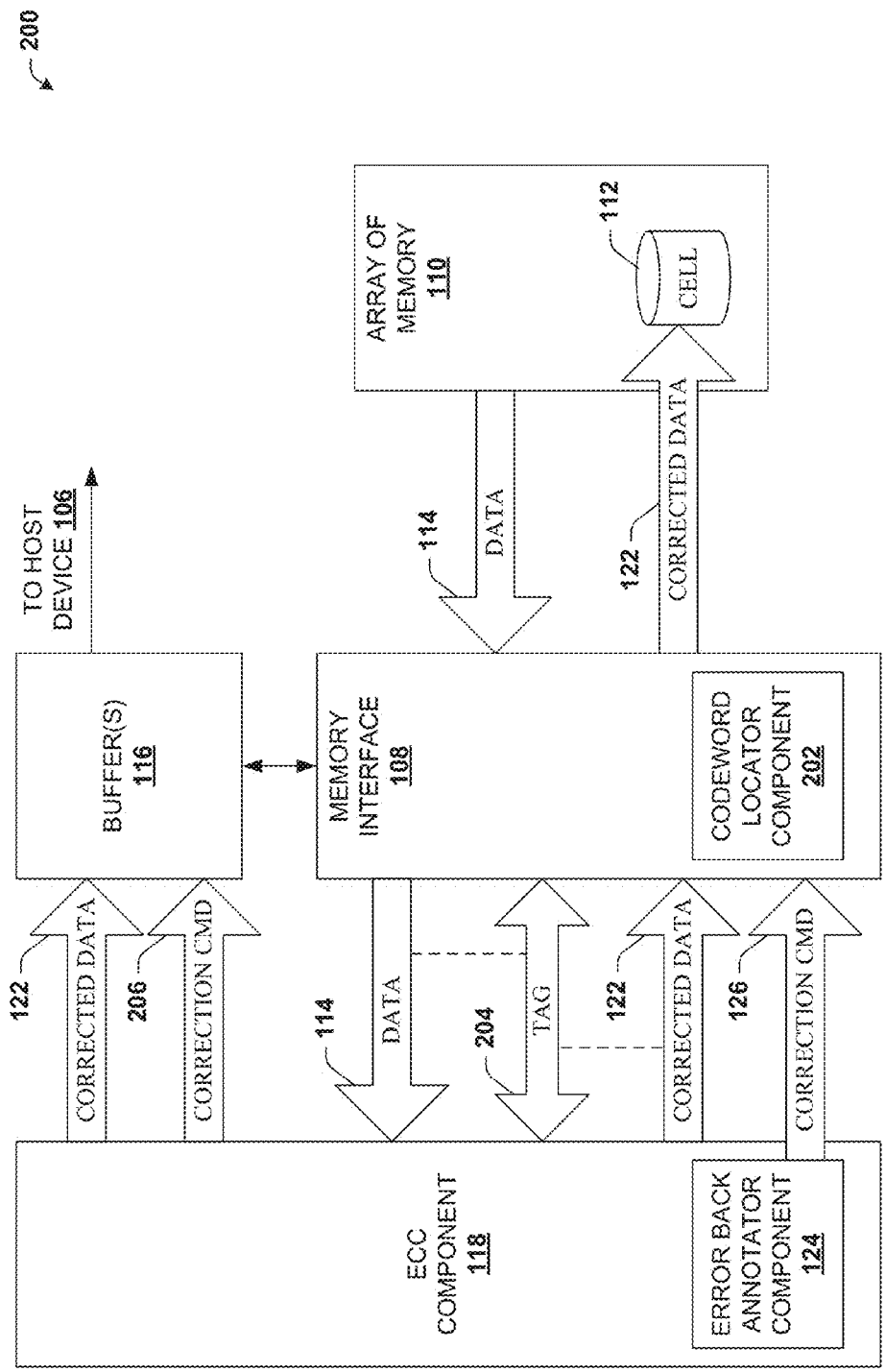
FIG. 2 illustrates a block diagram of an example system that can provide a codeword locator in connection with writing back corrected data memory cells with errors detected by error-correction code in accordance with certain embodiments of this disclosure.

While still referring to FIG. 1, but turning as well to FIG. 2, system 200 is provided. System 200 can provide a codeword locator in connection with writing back corrected data memory cells with errors detected by error-correction code. Similar to what was described previously in connection with FIG. 1, when controller 102 receives a read request (e.g., from host device 106) to read certain data from array of memory 110, controller 102 can request that data (e.g., data 114) from array of memory 110 and place data it in buffer 116. Data 114 (and associated parity data) can be provided to ECC component 118 in order to determine whether data 114 includes errors. If not, data 114 can be shipped to host device 106, error-free. If errors are detected, those errors can be corrected in buffer 116 by overwriting the bad data with corrected data 122 in response to correction command 206. Thereafter, data 114 can be shipped to host device 106, error-free.

As noted, corrected data 122 can also be provided to array of memory 110 and/or cell(s) 112 in response to correction command 126 that can be issued by error back-annotator component 124. As described, correction command 126 can take the form of a write instruction that writes corrected data 122 to the appropriate cell(s) from which cell data 113 (data determined to be in error) originated. In some embodiments, controller 102 can include codeword locator 202. Codeword locator 202 can be configured to identify a codeword associated with ECC algorithm 120 that comprises cell data 113. Put another way, codeword locator 202 can track the location of the bit error(s) based on a specific codeword, a specific page of memory or the like. Such can be beneficial in cases where memory device 100 employs pipelining, and in particular, pipelining associated with ECC operations in which many different codewords are pipelined and being processed in different stages of the ECC component 118, which may operate many pipelining stages (e.g., about five to eight). Codeword locator 202 can operate by tagging various portions of data 114, which is depicted as tag 204 and associating bit error(s) to the tagged portions of data 114, and further detailed in connection with FIG. 3B.

While still referring to FIG. 2, but turning as well to FIGS. 3A and 3B, illustrations 300 and 310 are depicted, respectively. Illustration 300 provides an example in which data 114 represents a page of memory that is divided into many codewords. As depicted, array of memory 110 can be logically separated into n pages of logical memory, where n can be substantially any positive number. In this example, logical page i includes the physical cell 112, that stores cell data 113. Page i is separated into multiple codewords. In some embodiments, these 1-m, where m can be substantially any number, codewords can represent discrete portions of page i that are individually processed by ECC component 118. For instance, ECC component 118 can include multiple decoders that can process one or more codewords 1-m in parallel. As depicted, cell data 113 is included in codeword j of logical page i.

Illustration 310 provides an example of information associated with the tag 204 managed by the codeword locator component 202. As described supra, code locator component 202 can identify a codeword that comprises the cell data 113. In some embodiments, such identification of cell data 113 can be based on page address 312 and a codeword ID 314 for the codeword within the page identified by page address 312. In this example, when codeword j is received from array of memory 110, codeword locator component 202 can generate tag 204. Tag 204 can include page address 312 that identifies page i, and codeword ID 314 can identify codeword j. Hence, once ECC component 118 eventually detects a location of bad data included in cell data 113 that is stored by cell 112, tag 204 in conjunction with the location of bad data within the codeword can be used to identify the logical address associated with cell data 113 and/or physical address of cell 112, as further detailed with reference to FIGS. 4 and 5.

In some embodiment, the codeword locator component 202 maintains a tag table or index, an example of which is non-volatile locator table 316. Non-volatile locator table 316 can include page address 312 and codeword ID 314 for all codewords in the pipeline. In some embodiments, tag 204 can be communicated to the ECC component 118 as an index (e.g., table index/pointer 318) pointing to an entry in the non-volatile locator table 316. Said differently, tag 204 can include a reference to a particular entry in non-volatile locator table 316 instead of or in addition to including page address 312 or codeword ID 314. In such embodiments, tag 204 can point to the entry in non-volatile locator table 316 that includes page address 312 or codeword ID 314 associated with cell data 113 that was determined to be incorrect. ECC component 118 and/or error back-annotator component 124 can employ the non-volatile locator table 316 in a similar manner to appropriately track the location of bad data regardless of pipelining stage progression.

Figure 4:
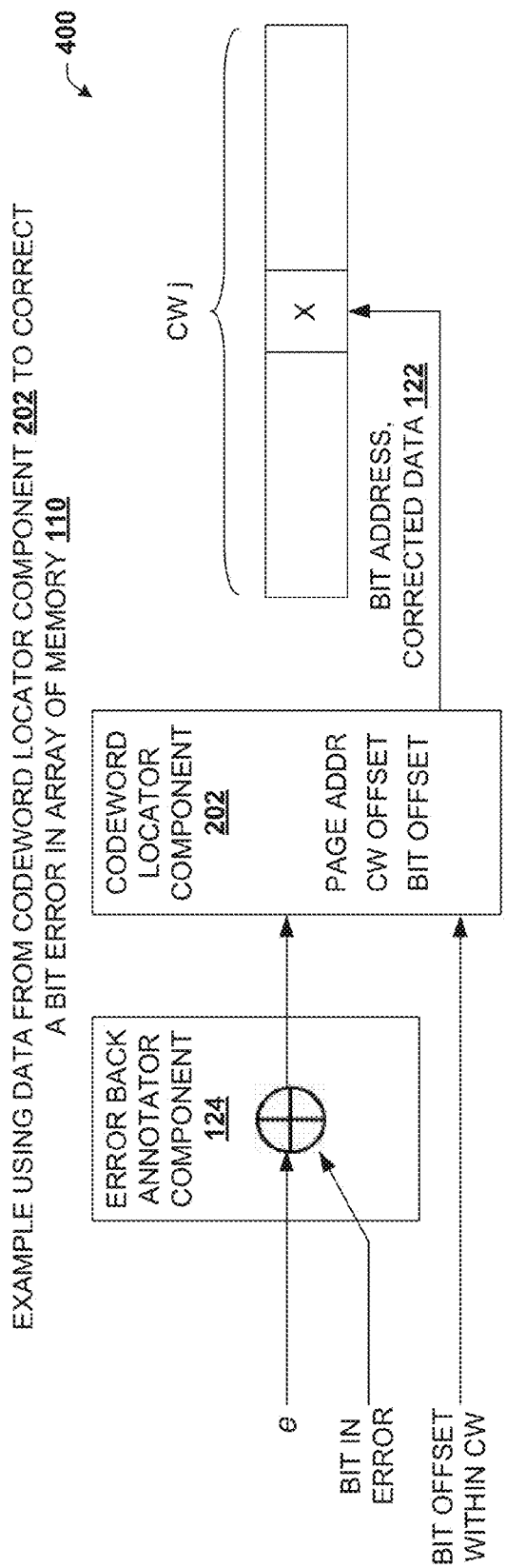
FIG. 4 illustrates a block diagram of an example system providing an example of using data from the codeword locator component to correct a bit error in array of memory in accordance with certain embodiments of this disclosure.

Turning now to FIG. 4, system 400 is depicted. System 400 provides an example of using data from the codeword locator component 202 to correct a bit error in array of memory 110. In this example, error back-annotator component 124 can issue memory correction command 126 (which can be a special-purpose write command) to correct cell data 113 maintained by cell 112. When pipelining is utilized by controller 102, then additional information may be required to fully locate the correct bit address, which can be provided by tag 204 (or a representative tag table) as described previously. For example, tag 204 can identify page address 312 and codeword ID 314. With the aforementioned information, codeword locator component 202 determine a page address (e.g., page address 312), a codeword offset (e.g., based on codeword ID 314), and a bit offset within the codeword given by ECC component 118. As noted previously, the bit error resides in cell 112 and is depicted here as data value "x", which is updated with corrected data 122. In the event cell 112 is an MLC, then bit address can be sufficient to update the appropriate bit or bits of cell 112.

Figure 5:
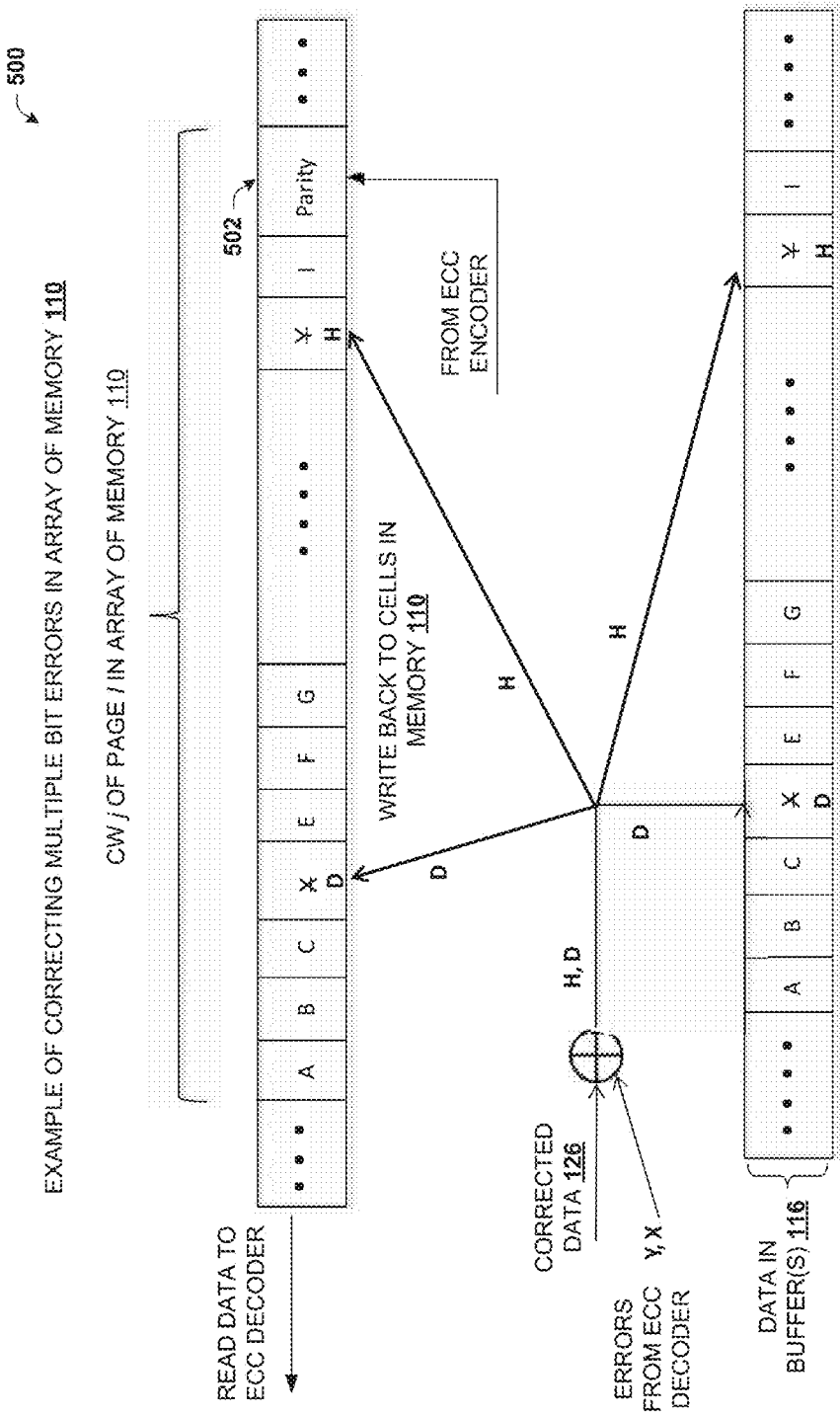
FIG. 5 depicts an example provides for an example of correcting multiple bit errors in the array of memory in accordance with certain embodiments of this disclosure.

Referring now to FIG. 5, illustration 500 is depicted. Illustration 500 provides for an example of correcting multiple bit errors in the array of memory 110. In this example, a single codeword, codeword j, is examined. Codeword j represents a portion of page i that is stored in array of memory 110, and includes two bit errors, denoted with values "X" and "Y" in strikethrough font to denote that these values will eventually be updated. Codeword j further includes parity data 502 that was generated by an encoder of ECC component 118 when the information included in codeword j was stored to array of memory 110. In this example, codeword j represents all or a portion of data 114 and one or more cell(s) 112 store the bit errors labeled "X" and "Y". Codeword j (including parity data 502) is provided to a decoder associated with ECC component 118 and loaded (either with or without parity data 502) to buffer 116. ECC component 118 detects location of bit errors associated with the values "X" and "Y" and error back-annotator component 124 determines associated corrected data 126, which have values "D" and "H". The bit location in buffer 116 storing value "X" is updated with corrected data 126 with value "D" and the bit location in buffer 116 storing value "Y" is updated with corrected data 126 with value "H". Likewise, potentially based on an instruction from error back-annotator component 124 and potentially with the aid of codeword locator component 202, the physical memory locations storing "X" and "Y" in memory 110 are also appropriately updated with corrected data 126.

Example Methods for Correcting an Error in Memory

The diagrams included herein are described with respect to interaction between several components, or memory architectures. It should be appreciated that such diagrams can include those components and architectures specified therein, some of the specified components/architectures, and/or additional components/architectures. Sub-components can also be implemented as electrically connected to other sub-components rather than included within a parent architecture. Additionally, it is noted that one or more disclosed processes can be combined into a single process providing aggregate functionality. For instance, a program process can comprise an erase process, or vice versa, to facilitate programming and erasing a semiconductor cell by way of a single process. In addition, it should be appreciated that respective rows of multiple cell memory architectures can be erased in groups (e.g., multiple rows erased concurrently) or individually. Moreover, it should be appreciated that multiple memory cells on a particular row can be programmed in groups (e.g., multiple memory cells programmed concurrently) or individually. Components of the disclosed architectures can also interact with one or more other components not specifically described herein but known by those of skill in the art.

Figure 6:
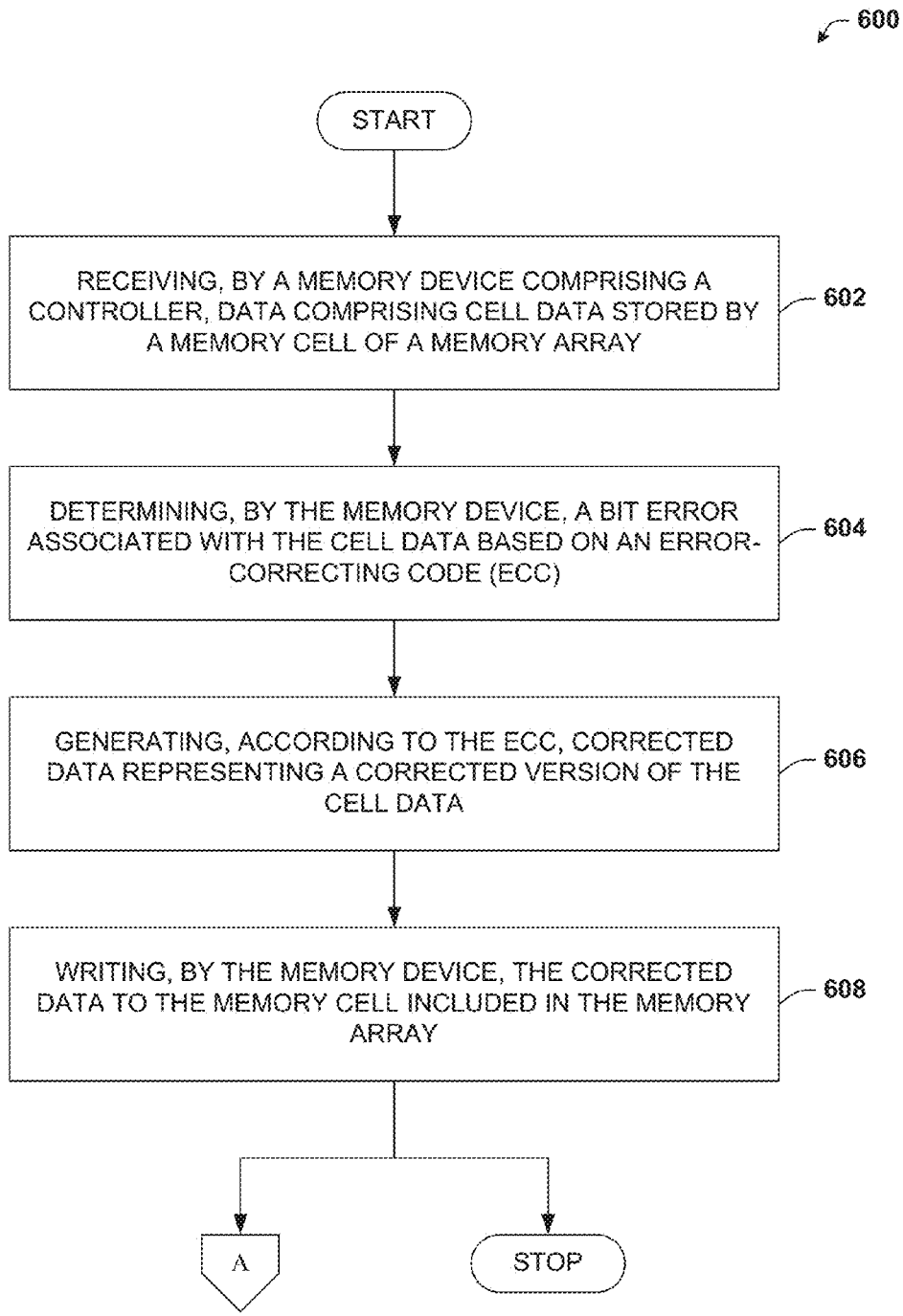
FIG. 6 illustrates an example methodology that can provide for writing back corrected data to memory cells storing errors detected by error-correction code in accordance with certain embodiments of this disclosure.
Figure 7:
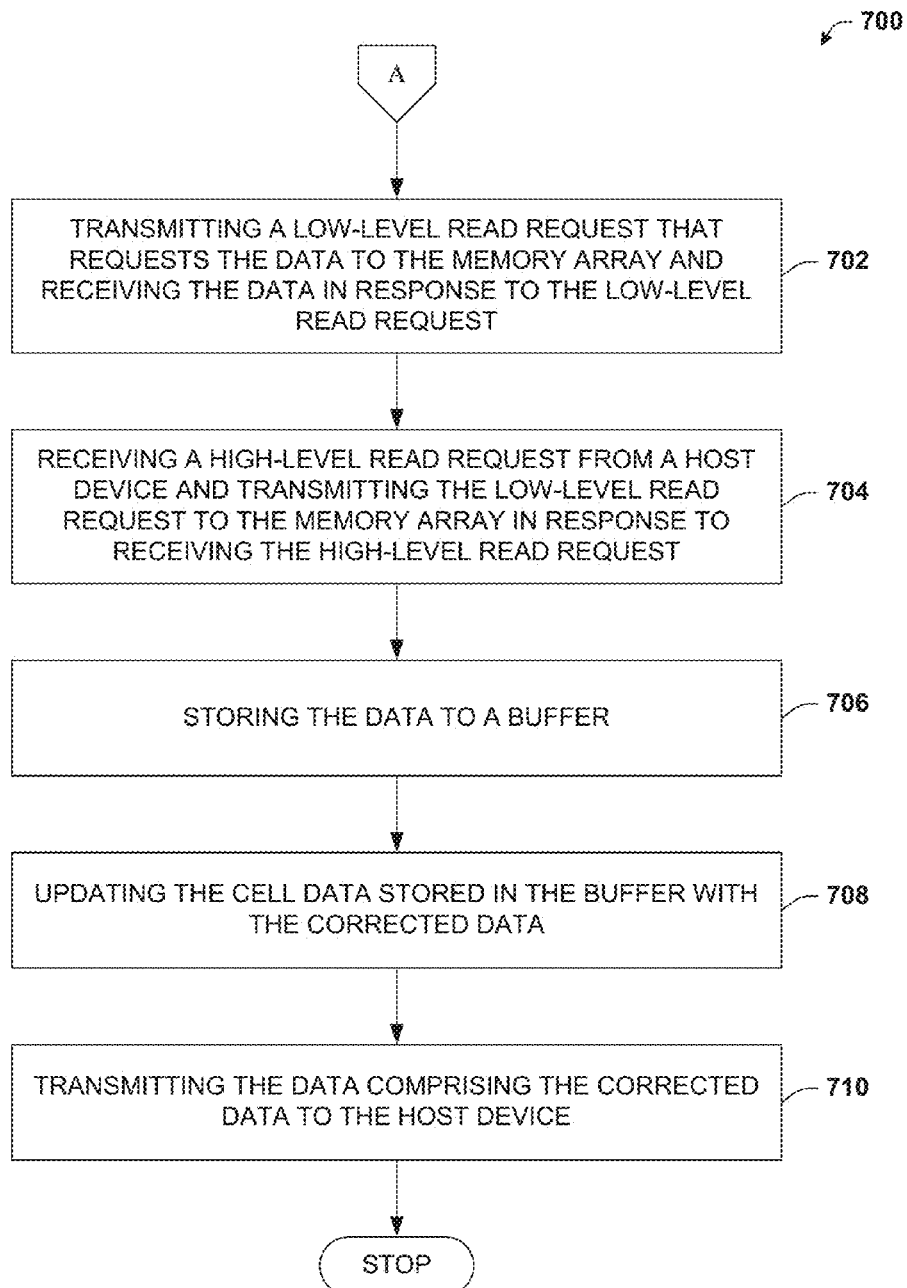
FIG. 7 illustrates an example methodology that can provide for additional aspects or elements in connection with writing back corrected data to memory cells in accordance with certain embodiments of this disclosure.
Figure 8:
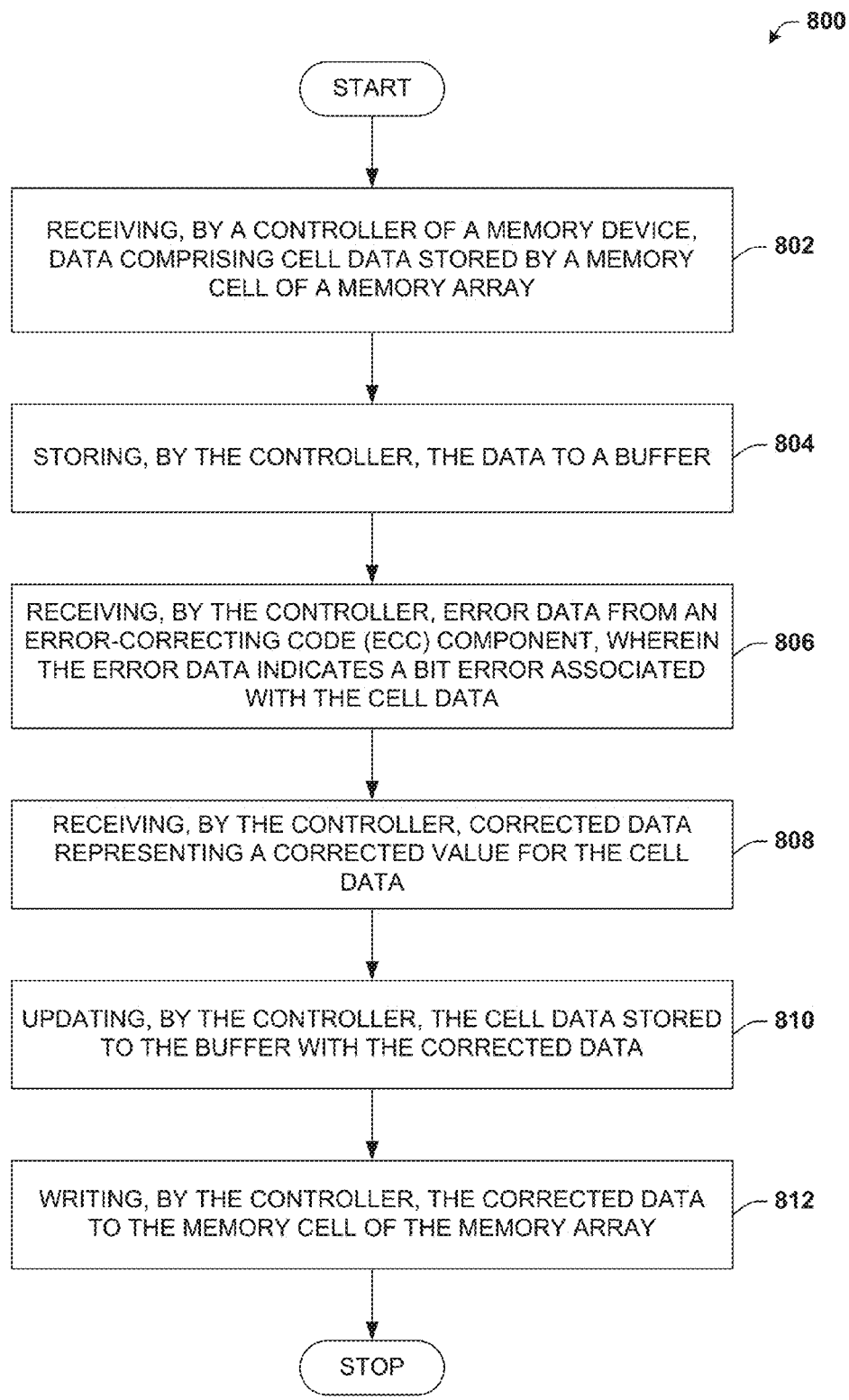
FIG. 8 illustrates an example methodology that can provide for generating corrected data, updating the data in a buffer with the corrected data, and writing back the corrected data to memory cells in accordance with certain embodiments of this disclosure.

In view of the exemplary diagrams described supra, process methods that can be implemented in accordance with the disclosed subject matter will be better appreciated with reference to the flow charts of FIGS. 6-8. While for purposes of simplicity of explanation, the methods of FIGS. 6-8 are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

Referring now to FIG. 6, exemplary method 600 is illustrated. Method 600 can provide for writing back corrected data to memory cells storing errors detected by error-correction code. At reference numeral 602, a memory device comprising a controller can receive data. The data received can comprise cell data stored by a memory cell of a memory array. Cell data represent a single bit of data in the case of SLC, or a single bit or multiple bits in the case of MLC. The memory cell can be two-terminal memory, resistive memory, non-volatile memory, or combinations thereof.

At reference numeral 604, the memory device can determine a bit error associated with the cell data. This bit error can be determined by an ECC component of the memory device and can be based on a suitable ECC such as BCH, RS, LDPC or the like. At reference numeral 606, the memory device can generate, according to the suitable ECC, corrected data representing a corrected version of the cell data.

At reference numeral 608, the memory device can write the corrected data to the memory cell included in the memory array. Advantageously, subsequent reads of cell data can yield correct data instead of the bit error previously detected. Hence, the accumulation of bit errors can be mitigated, reducing stress and overhead on the ECC component and/or extending the coverage provided by the ECC component. Method 600 can end or proceed to insert A, which is detailed in connection with FIG. 7.

Turning now to FIG. 7, exemplary method 700 is illustrated. Method 700 can provide for additional aspects or elements in connection with writing back corrected data to memory cells. As detailed in connection with reference numeral 602 of FIG. 6, data from the memory array can be received by the controller, which can be in response to a read data command or the like. For example, at reference numeral 702, the controller can transmit to the memory array a low-level read request that request the data and receive the data in response to this low-level read request.

In some embodiments, the read request can be based on a similar request from a host device that is received by the memory device. For instance, at reference numeral 704, the memory device can receive a high-level read request that requests the data. As noted, this high-level read request can be received from a host device. The high-level read request can be translated into the low-level read request (e.g., including logical to physical mapping, etc.) and the low-level read request can be provided to the memory array in response.

At reference numeral 706, the data (e.g., received from the memory array and including the cell data) can be stored to a buffer. At reference numeral 708, the cell data stored in the buffer can be updated with the corrected data determined at reference numeral 606 of FIG. 6. At reference numeral 710, the data comprising the corrected data can be transmitted to the host device.

It is understood that in some embodiments the cell data can be updated as part of a memory management procedure. For example, an associated controller can implement a memory correction routine, for instance, during periods of relative low activity. The memory management procedure can operate to read data from the memory, check for errors, and fix those errors as detailed herein. Such need not be in response to a host device requesting the data, although the memory correction routine can be ordered by the host device (e.g., based on settings associated with the host device) or can be determined by the controller (e.g., based on settings associated with the controller). In some embodiments, the disclosed subject matter can also be used in connection with "touching" memory or other techniques associated with improving memory retention. Given that memory cells tend to lose the stored data if that data has not been accessed for a long time, the controller can issue read instructions and/or the memory correction routine directed to portions of the memory array that have not been accessed for a period of time that exceeds a defined threshold.

Referring now to FIG. 8, exemplary method 800 is illustrated. Method 800 can provide for generating corrected data, updating the data in a buffer with the corrected data, and writing back the corrected data to memory cells. At reference numeral 802, a controller of a memory device can receive data comprising cell data stored by a memory cell of a memory array.

At reference numeral 804, the controller can facilitate storing the data to a buffer. The controller can facilitate providing the data to an ECC component that detects and/or corrects errors associated with the data. At reference numeral 806, the controller can receive from the ECC component error data. This error data can be generated by decoders of the ECC component that processes the data (that includes the cell data) and associated parity data. Generally, error data indicates one or more bit error associated with the cell data.

At reference numeral 808, the controller can receive corrected data representing a corrected value for the cell data that the error data indicates is in error. At reference numeral 810, the controller can facilitate updating the cell data stored to the buffer with the corrected data. At reference numeral 812, the controller can facilitate writing the corrected data to the memory cell of the memory array. Thus, the memory cell that previously stored cell data determined to be corrupted or otherwise in error can be replaced with corrected data. It is appreciated that this correcting of the cell data occurs in the memory cell, which is distinct from correcting the cell data in the buffer alone. Correcting the cell data at the memory cell mitigates the accumulation of errors when data from that memory cell is subsequently read. Correcting the cell data at the memory cell is not feasible with other types of memory, but can be accomplished in connection with the two-terminal memory disclosed herein.

Example Operating Environments

Figure 9:
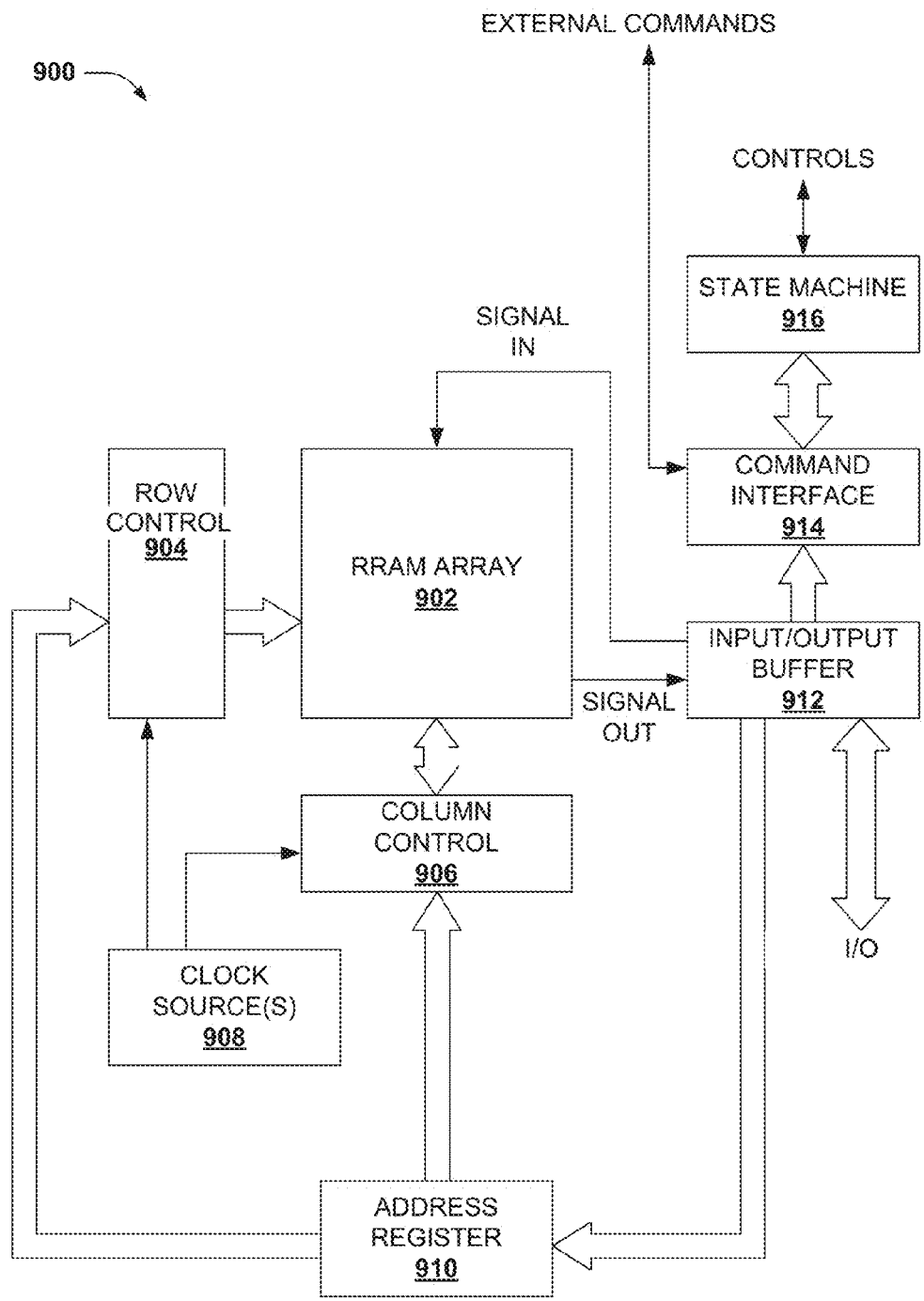
FIG. 9 illustrates a block diagram of an example electronic operating environment in accordance with certain embodiments of this disclosure.

In order to provide a context for the various aspects of the disclosed subject matter, FIG. 9, as well as the following discussion, is intended to provide a brief, general description of a suitable environment in which various aspects of the disclosed subject matter can be implemented or processed. While the subject matter has been described above in the general context of semiconductor architectures and process methodologies for fabricating and operating such architectures, those skilled in the art will recognize that the subject disclosure also can be implemented in combination with other architectures or process methodologies. Moreover, those skilled in the art will appreciate that the disclosed processes can be practiced with a processing system or a computer processor, either alone or in conjunction with a host computer, which can include single-processor or multiprocessor computer systems, mini-computing devices, mainframe computers, as well as personal computers, handheld computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone electronic devices, such as a memory card, Flash memory module, removable memory (e.g. CF card, USB memory stick, SD card, microSD card), or the like. In a distributed computing environment, program modules can be located in both local and remote memory storage modules or devices.

FIG. 9 illustrates a block diagram of an example operating and control environment 900 for a RRAM array 902 according to aspects of the subject disclosure. In at least one aspect of the subject disclosure, RRAM array 902 can comprise a variety of RRAM memory cell technology. Particularly, RRAM array can be configured or operated to mitigate or avoid sneak path currents of the RRAM array, as described herein.

A column controller 906 can be formed adjacent to RRAM array 902. Moreover, column controller 906 can be electrically coupled with bit lines of RRAM array 902. Column controller 906 can control respective bitlines, applying suitable program, erase or read voltages to selected bitlines.

In addition, operating and control environment 900 can comprise a row controller 904. Row controller 904 can be formed adjacent to column controller 906, and electrically connected with word lines of RRAM array 902. Row controller 904 can select particular rows of memory cells with a suitable selection voltage. Moreover, row controller 904 can facilitate program, erase or read operations by applying suitable voltages at selected word lines.

A clock source(s) 908 can provide respective clock pulses to facilitate timing for read, write, and program operations of row control 904 and column control 906. Clock source(s) 908 can further facilitate selection of word lines or bit lines in response to external or internal commands received by operating and control environment 900. An input/output buffer 912 can be connected to an external host apparatus, such as a computer or other processing device (not depicted) by way of an I/O buffer or other I/O communication interface. Input/output buffer 912 can be configured to receive write data, receive an erase instruction, output readout data, and receive address data and command data, as well as address data for respective instructions. Address data can be transferred to row controller 904 and column controller 906 by an address register 910. In addition, input data is transmitted to RRAM array 902 via signal input lines, and output data is received from RRAM array 902 via signal output lines. Input data can be received from the host apparatus, and output data can be delivered to the host apparatus via the I/O buffer.

Commands received from the host apparatus can be provided to a command interface 914. Command interface 914 can be configured to receive external control signals from the host apparatus, and determine whether data input to the input/output buffer 912 is write data, a command, or an address. Input commands can be transferred to a state machine 916.

State machine 916 can be configured to manage programming and reprogramming of RRAM array 902. State machine 916 receives commands from the host apparatus via input/output interface 912 and command interface 914, and manages read, write, erase, data input, data output, and like functionality associated with RRAM array 902. In some aspects, state machine 916 can send and receive acknowledgments and negative acknowledgments regarding successful receipt or execution of various commands.

To implement read, write, erase, input, output, etc., functionality, state machine 916 can control clock source(s) 908. Control of clock source(s) 908 can cause output pulses configured to facilitate row controller 904 and column controller 906 implementing the particular functionality. Output pulses can be transferred to selected bit lines by column controller 906, for instance, or word lines by row controller 904, for instance.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
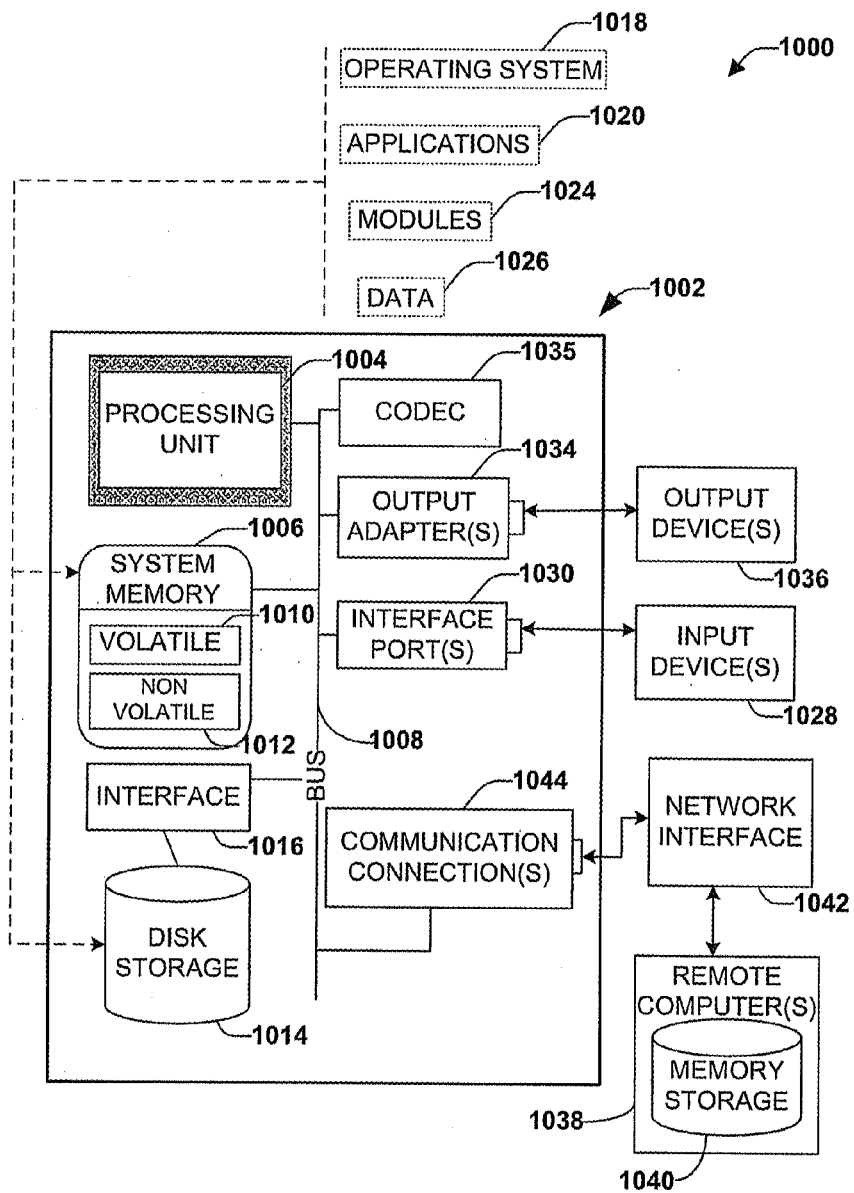
FIG. 10 illustrates a block diagram of an example computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to opt-in or opt-out of having such information collected and/or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, replicating, mimicking, determining, or transmitting, and the like, refer to the action and processes of processing systems, and/or similar consumer or industrial electronic devices or machines, that manipulate or transform data or signals represented as physical (electrical or electronic) quantities within the circuits, registers or memories of the electronic device(s), into other data or signals similarly represented as physical quantities within the machine or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A non-volatile memory device, comprising:
a controller portion that receives, from a memory array comprising a plurality of non-volatile memory cells, a plurality of read data and parity data associated with write data for the plurality of non-volatile memory cells, wherein the plurality of non-volatile memory cells includes a first set of one or more non-volatile memory cells and a second set of non-volatile memory cells;
an error-correcting code (ECC) portion coupled to the controller portion, wherein the ECC portion receives the plurality of read data and the parity data, wherein the ECC portion determines non-volatile memory cells for the first set of one or more non-volatile memory cells having read data that is incorrect in response to an ECC algorithm; and
an error back-annotator component coupled to the ECC portion that generates a memory correction command characterized by programming the non-volatile memory cells of the first set of one or more non-volatile memory cells with modified data but not all of the non-volatile memory cells from the second set of non-volatile memory cells.

2. The memory device of claim 1, wherein the memory cell is a non-volatile, resistive, two-terminal memory cell.

3. The memory device of claim 1, wherein the plurality of non-volatile memory cells is one of: phase-change memory (PCM), resistive random access memory (RRAM), magnetoresistive random access memory (MRAM), or conductive-bridging random access memory (CBRAM).

4. The memory device of claim 3, wherein the controller portion requests the plurality of read data from the memory array in response to receiving a request for the plurality of read data from the host device.

5. The memory device of claim 1, wherein the controller portion interfaces to a host device via a host interface.

6. The memory device of claim 1, wherein the ECC algorithm is at least one of a Hamming code, a Bose-Chaudhuri-Hocquenghem (BCH) code, a Reed-Solomon (RS) code, or a low-density parity check (LDPC) code.

7. The memory device of claim 1, further comprising a buffer device coupled to the ECC portion that temporarily stores the plurality of read data.

8. The memory device of claim 7, wherein the memory correction command is further characterized by updating the plurality of read data stored in the buffer device with the modified data.

9. The memory device of claim 1, wherein the memory device transmits a combination of the plurality of read data and the modified data to a host device.

10. The memory device of claim 1, wherein the controller portion includes a code locator component that identifies the parity data associated with the write data for the plurality of memory cells.

11. The memory device of claim 10, wherein the parity data associated with the plurality of read data is determined from multiple parity data stored in the memory array.

12. The memory device of claim 1, wherein a memory cell of the plurality of non-volatile memory cells is a multi-level cell (MLC) characterized by measurable states of the MLC representing multiple bits of information.

13. A method for a memory device, comprising:
receiving, in a controller, data comprising a plurality of read data stored in a plurality of non-volatile memory cells in a memory array and parity data associated with data written into the plurality of non-volatile memory cells, wherein the plurality of non-volatile memory cells includes a first set of one or more memory cells and a second set of memory cells;
determining, by the controller, memory cells for the first set of one or more memory cells having read data that is incorrect, in response to a comparison with the parity data;
determining, in the controller, corrected read data for the memory cells in the first set of one or more memory cells; and
directing writing, with the controller, of the corrected read data to memory cells in the first set of one or more memory cells, while inhibiting writing, with the controller, of data to at least one memory cell in the second set of memory cells.

14. The method of claim 13, further comprising transmitting a low-level read request that requests the plurality of read data from the memory array and receiving the plurality of read data in response to the low-level read request.

15. The method of claim 14, further comprising receiving a high-level read request from a host device and transmitting the low-level read request to the memory array in response to receiving the high-level read request.

16. The method of claim 13, further comprising storing the plurality of read data to a buffer.

17. The method of claim 16, further comprising updating the plurality of read data stored in the buffer with the corrected read data.

18. The method of claim 13, further comprising transmitting a combination of the plurality of read data and the corrected read data to a host device.

19. A method for a memory device, comprising:
receiving, in a controller, data comprising cell data stored in a non-volatile memory cell of a memory array;
receiving error information from an error-correcting code (ECC) component, wherein the error information represents first information associated with a bit error associated with the cell data;
receiving, in the controller, corrected information representing second information associated with a corrected value for the cell data; and
directing, with the controller, a write of the corrected information to the non-volatile memory cell.

20. The method of claim 19, further comprising receiving the data in response to transmitting a low-level read request to the memory array.

21. The method of claim 20, further comprising transmitting the low-level read request to the memory array in response to receiving a high-level read request from a host device.

22. The method of claim 21, further comprising transmitting the corrected information to the host device.

* * * * *